(12) United States Patent
Bauer et al.

(10) Patent No.: US 11,501,249 B2
(45) Date of Patent: Nov. 15, 2022

(54) SYSTEM FOR STOCK MANAGEMENT FOR ON-BOARD CATERING FOR A VEHICLE (71) Applicant: Airbus Operations GmbH, Hamburg (DE)

(72) Inventors: Michael Bauer, Hamburg (DE); Matthias Reiss, Hamburg (DE); Norbert Kaufeld, Hamburg (DE); Tobias Dahms, Hamburg (DE); Heinrich Hoelscher, Hamburg (DE); Rafael Mortensen Ernits, Bremen (DE); Michael Freitag, Bremen (DE)

(73) Assignee: Airbus Operations GmbH ( * ) Notice: Subject to any disclaimer, the term of this patent is extended or adjusted under 35 U.S.C. 154(b) by 172 days.

(21) Appl. No.: 16/371,413

(22) Filed: Apr. 1, 2019

(65) Prior Publication Data
US 2019/0311318 A1 Oct. 10, 2019

(30) Foreign Application Priority Data
Apr. 9, 2018 (DE) ..................... 10 2018 205 289.1

(51) Int. Cl.
G06Q 10/08 (2012.01)
B65G 1/04 (2006.01)
(Continued)

(52) U.S. Cl.
CPC ....... *G06Q 10/087* (2013.01); *B64D 11/0007* (2013.01); *B64D 11/04* (2013.01); *B65G 1/0492* (2013.01); *B65G 2201/0202* (2013.01); *B65G 2203/0216* (2013.01); *B65G 2203/041* (2013.01); *G06F 3/0488* (2013.01)

(58) Field of Classification Search
CPC combination set(s) only.
See application file for complete search history.

(56) References Cited

U.S. PATENT DOCUMENTS

| 5,505,473 | A |   | 4/1996 | Radcliffe |
| 5,877,962 | A | * | 3/1999 | Radcliffe ............. G06Q 10/087 |
|           |   |   |        | 705/28 |

(Continued)

FOREIGN PATENT DOCUMENTS

| DE | 197 32 597 C2 | 8/1999 |
| DE | 10 2007 007717 A1 | 8/2008 |

(Continued)

*Primary Examiner* — Kyle O Logan
(74) *Attorney, Agent, or Firm* — Lerner, David, Littenberg, Krumholz & Mentlik, LLP (57) ABSTRACT A system for stock management for on-board catering for a vehicle, in particular for an aircraft, includes a galley which is provided with a control unit for controlling the galley, wherein the control unit is designed to make available stock management data of the galley; a service unit for transporting supplies within the vehicle, wherein the stock management data comprise a stock record of the supplies transported with the service unit; and at least one operator control element which is communicatively connected to the control unit of the galley via a wireless data connection and is designed to record removal of a supply item from the service unit and/or reception of a supply item into the service unit, and to bring about updating of the stock record of the transported supplies on the basis thereof.

14 Claims, 2 Drawing Sheets (51) Int. Cl.
  *B64D 11/00* (2006.01)
  *B64D 11/04* (2006.01)
  *G06F 3/0488* (2022.01)

(56) References Cited

U.S. PATENT DOCUMENTS

| | | | |
|---|---|---|---|
| 5,999,099 A | 12/1999 | Stobbe | |
| 8,378,825 B2 | 2/2013 | Dahms et al. | |
| 9,221,549 B2 | 12/2015 | Kollakowski | |
| 2009/0112377 A1 | 4/2009 | Schalla et al. | |
| 2011/0090064 A1* | 4/2011 | Dahms | G06Q 10/00 340/10.42 |
| 2011/0238742 A1 | 9/2011 | Birkmann et al. | |
| 2015/0057796 A1 | 2/2015 | Boodaghians | |
| 2016/0217417 A1* | 7/2016 | Ma | G06V 20/52 |
| 2017/0236195 A1* | 8/2017 | Verweij | G06Q 10/087 705/27.1 |
| 2017/0276768 A1* | 9/2017 | Wulff | G01S 5/18 |
| 2018/0033076 A1* | 2/2018 | Roundtree | G06K 3/00 |
| 2019/0241268 A1* | 8/2019 | Iacobucci | B65F 1/1405 |
| 2020/0219606 A1* | 7/2020 | Koh | G06Q 30/0631 |

FOREIGN PATENT DOCUMENTS

| | | |
|---|---|---|
| DE | 10 2009 058 327 A1 | 4/2011 |
| DE | 10 2010 027709 A1 | 1/2012 |

* cited by examiner

SYSTEM FOR STOCK MANAGEMENT FOR ON-BOARD CATERING FOR A VEHICLE

FIELD OF THE INVENTION

The present invention relates to a system for stock management for on-board catering for a vehicle.

BACKGROUND OF THE INVENTION

Although the present invention can be used in a variety of applications, it is explained in more detail, along with the problems on which it is based, with respect to passenger aircraft. However, the described methods and devices can also be used in different vehicles and in all fields of the transportation industry, for example for road vehicles, for rail vehicles, for aircraft or for watercraft.

Galleys which are currently provided on board modern passenger aircraft usually comprise storage locations or slide-in unit compartments into which containers and/or roller containers (referred to in English as "trolley" or "galley cart") can be inserted, said containers being loaded with supplies or service products such as e.g. food and/or drinks to be supplied to the passengers on board the aircraft. In order to indicate the contents of the trolleys or containers they are classically provided with labels which the catering company applies during the loading process. In addition, lists are produced from which the cabin crew obtain a breakdown of the available service products and their storage positions in the aircraft galley. Since these lists for the cabin crew only convey the initial loading state of the aircraft galley, it is difficult for the cabin crew to maintain an overview of the stock of the galley during the flight.

Document DE 10 2009 058 327 A1 discloses a system for stockkeeping in an aircraft galley, in which system receptacle devices such as standard units, slide-in units or trolleys or the like are provided with transponders which emit identification signals which are characteristic of the content thereof and are in turn read in by a transceiver unit of the galley in order in this way to determine the stock of the galley. As a result, the overview over the stock of the galley is to be improved.

BRIEF SUMMARY OF THE INVENTION

Against this background, an aspect of the present invention relates to finding improved solutions for the stock management for on-board catering, in which at any time the overview over the stock is maintained while the products are being distributed.

Accordingly, a system for stock management for on-board catering for a vehicle is provided. The system comprises a galley which is provided with a control unit for controlling the galley, wherein the control unit is designed to make available stock management data of the galley; a service unit for transporting supplies within the vehicle, wherein the stock management data comprise a stock record of the supplies transported with the service unit; and at least one operator control element which is communicatively connected to the control unit of the galley via a wireless data connection and is designed to record removal of a supply item from the service unit and/or reception of a supply item by the service unit, and to bring about updating of the stock record of the transported supplies on the basis thereof.

Furthermore, an aircraft having the system according to an embodiment of the invention is provided.

A concept on which the present invention is based is to administer a stock record of the existing supplies or service products centrally in the galley and to keep said record up-to-date even if in the meantime individual supplies have been distributed to the passengers or the crew or issued in some other manner. For this purpose, aspects of the present invention makes available a wireless data connection which connects the galley to at least one operator control element. The operator control element or elements serves/serve to detect the issuing of a supply item from the service unit and to communicate this information to the galley via the wireless connection. On the basis thereof, the stock record is then correspondingly updated. The reception of a supply item by the service unit can also be correspondingly recorded and the stock record correspondingly updated. Therefore, the currently present stock of supplies can be called up in the galley at any time. Ultimately, an aspect of the invention provides the possibility of tracking present service products and monitoring their availability in an automated fashion, in particular in real time, in a cabin of a vehicle. For example, the at least one operator control element can communicate a current position, i.e. in which row of passengers and/or in which cabin section the controlling person, i.e. the operator control element, and/or the service unit are located. An aspect of the invention therefore makes available an automated merchandise management system for catering goods for a vehicle, in particular for a vehicle cabin, which system informs the cabin crew at any time in a dynamic fashion about the current stock of the goods and their order situation.

For example, personnel of a vehicle cabin can carry such an operator control element on their person, e.g. in the form of a portable computer, a mobile terminal or a smart mobile device. In another example, the operator control element can be arranged or mounted on a roller container which serves as a service unit and/or can be integrated therein in some other way. As soon as the cabin crew, e.g. flight attendants, remove a product from the roller container or some other service unit and issue it to a passenger, the removal of the product can be detected using the operator control element and the product can, if appropriate, be identified automatically, e.g. using a barcode scanner or the like. Subsequently, updating of the stock list or the stock record can be brought about by means of the operator control element, which list or record is assigned to this roller container or this service unit and comprises a listing of the products which are contained or transported therein.

A service unit according to an embodiment of the invention denotes, on the one hand, service vehicles, i.e. trolleys, food trolleys or the like. However, service units according to an embodiment of the invention also comprise general receptacle devices or transportation devices for supplies and/or service products such as, for example, containers, standard units or the like. Furthermore, a tray or a corresponding transportation device can also constitute a service unit according to an embodiment of the invention. In this case it is registered whether a supply item is removed from the tray or placed on said tray. Subsequently, the stock record of the tray is correspondingly updated. It will become clear here to a person skilled in the art that an aspect of the present invention basically permits the wireless connection of the galley with a multiplicity of such service units. A multiplicity of operator control units can also be provided.

The wireless connection according to an embodiment of the invention can be implemented, for example, by means of a wireless local network, e.g. a WLAN or the like. Different embodiments are conceivable for this purpose. For example, a wireless network which is already present in any case for other purposes in a passenger cabin can be used. On the other hand, it is conceivable to make available a separate wireless network specifically for this purpose. This may be, in particular, a secured network which can only be accessed by persons or devices with corresponding security authentication, e.g. the on-board personnel of the vehicle and/or corresponding electronic devices which are to be/can be operated only by the on-board personnel.

Advantageous refinements and developments emerge from the description with reference to the figures.

According to one development, the at least one operator control element can have an identification unit. The identification unit can be designed to identify a supply item on the basis of a label which is attached thereto. For example, optoelectronically readable text such as barcodes or the like can be attached to the outside of the supplies and can be recognized by the identification unit. The identification unit can correspondingly be embodied, for example, as a barcode scanner or the like. Barcodes according to an embodiment of the invention comprise here both unidimensional and linear barcodes, i.e. in particular barcodes as well as two-dimensional designs or matrix codes, e.g. QR codes, etc. Alternatively or additionally, the identification unit can be designed for general object recognition. For example, the identification unit can have a camera which can be used to capture shapes, colours, etc. of objects and/or surfaces and identify a supply item on the basis thereof.

According to one development the identification unit can be embodied as a barcode reader. The identification unit can therefore be embodied as a data acquisition device which can read and pass on various barcodes or the like. The barcode reader can be configured, for example, as a CCD scanner, laser scanner or the like. However, barcode readers according to an embodiment of the invention also comprise camera scanners or imagers, i.e. devices which capture a barcode using an, in particular optical, camera, and subsequently prepare the captured image by means of digital image processing, in order to capture the barcode in digital form.

According to one development, the at least one operator control element can be designed to display the stock management data. For example, the operator control element can have a display such as a screen or some other electronic optical display on which the stock management data can be displayed. In a specific example, the operator control element can be a smart mobile device, e.g. data glasses (smartglasses) which can project information onto one or both lenses of the glasses. The data glasses can also be equipped with a camera scanner which is designed to capture barcodes. Furthermore, the data glasses can be connected to a (secure) wireless network. The flight personnel can wear such data glasses, for example while serving food and/or drinks. The data glasses can capture and identify each service product which is served, so that the stock record of the service products can be kept up-to-date at all times by the transmission of data via the wireless network, without the usual catering operation being in any way impeded or adversely affected.

According to one development, stock management data can comprise catering data, passenger data and/or cabin data or the like. The stock management data therefore comprise in this development not only a stock record or a stock list of one or more service units or of the galley. Furthermore, various additional information items or data can be included. For example, the stock management data can contain catering data which is made available by a catering service provider and can contain, inter alia, information about the supplied on-board catering, i.e. which products are made available to what extent and in which form. Furthermore, the stock management data can contain passenger data which include e.g. data about which passengers have registered specific catering requests or options. Furthermore, the stock management data can contain cabin data. Cabin data can comprise, for example, a seating plan of the passengers.

According to one development, the at least one operator control element can comprise a first operator control element. The first operator control element can be embodied as a portable computer.

According to one development, the first operator control element can be a tablet computer, a smartphone, a smartwatch or data glasses (smartglasses).

According to one development, the at least one operator control element can comprise a second operator control element. The second operator control element can be integrated by the service unit. For example, the second operator control element can be attached to or (releasably or non-releasably) mounted on the outside of the service unit, for example in the form of a touchpad or a tablet computer. In another example, the second operator control element can be a touchscreen or electronic operator control pad which is embedded in a housing of the service unit. The second operator control element can also have an identification unit, e.g. a barcode reader by means of which supply products can be registered. For example, the operator control element can be integrated into a service trolley or roller container. Alternatively or additionally, the operator control element can, for example, also be integrated into a tray, which can therefore detect the placing of supplies thereon or removal of said supplies therefrom as a "smart tablet".

According to one development, the second operator control element can be a touchscreen and/or an electronic operator control pad.

According to one development, the at least one operator control element can be designed to identify the service unit and to assign the stock record to the service unit on the basis thereof. In one embodiment, for example customary roller containers can be used without an electronic connection to the wireless network. The roller containers can be labelled, for example, with a barcode or some other labelling means. By means of the label it is possible in turn to assign a stock record unambiguously to the roller container in the existing stock management data, wherein the information can be made available, for example, as catering data by a catering service provider. The operator control element can have, for example, an identification unit, e.g. a barcode reader, which is used to identify the roller container. On the basis thereof, the assigned stock record can be updated centrally by means of the operator control element during subsequent service of food and/or drinks without the roller container itself having to be connected to the wireless network in any form. Alternatively or additionally, in addition to barcodes it is also possible to use other identification means. For example, the service unit can have an RFID tag or the like, which can be read out from a reading device or identification device provided in the operator control element.

According to one development, the at least one operator control element can be designed to authenticate itself with respect to the service unit, wherein access to the stock record of the service unit and/or the supplies of the service unit is enabled after successful authentication. In particular, the operator control element can be designed to administer the access to the supplies and/or the stock record of the service unit, i.e. enable or disable this access. In this development, it is possible, inter alia, to implement a digital lock system in which the on-board personnel must firstly authenticate themselves using the operator control element before said personnel receive access to the content and/or data of the service unit. The operator control element, e.g. a smartphone or a tablet computer, can comprise a software application which can be used to lock and unlock the service unit, in order to disable or enable the access to the transportation items and/or the data of the service unit. The locking means can be, for example, an electronic locking means which can be activated via a wireless data connection. For example, the service unit can be identified by means of a RFID tag attached thereto. Certified operator control elements can then authenticate themselves by means of corresponding software applications, and after successful authentication they can access the data and/or the supplies of the service unit. It will become clear to a person skilled in the art here that a lock system can also be implemented purely at the level of software, i.e. therefore only the access to the data of the service unit can consequently be administered. Likewise, combinations of hardware solutions and software solutions are possible.

According to one development, the service unit can comprise a data memory. The data memory can be designed to store the stock record. In principle, in this context different designs are conceivable. For example, the service unit can contain a data memory which can be written to once or re-written to and which can be written to exclusively by a catering service provider and can only be read by the flight personnel, e.g. by means of the at least one operator control element. In this case, the stock record can be updated centrally by means of the control unit of the galley for each service unit. However, it is also alternatively or additionally possible to provide that an active intervention in the data memory is enabled for the flight personnel, with the result that an updated version of the stock record can be produced directly on the data memory of the service unit.

According to one development, the at least one operator control element can be communicatively connected to the data memory of the service unit and be designed to read the stock record out of the data memory. For example, the service unit can be equipped with an active or passive RFID tag which comprises a corresponding transponder and an electronic data memory which can in turn be read by a suitable reading device which can be integrated into the at least one operator control element. For example, the stock record can already have been created by a catering service provider on the data memory in accordance with the supplied equipment of the service unit before the loading onto the vehicle occurs. The flight personnel can then identify the service unit and/or detect its contents using the operator control element before use occurs. The corresponding stock record is continuously updated during use in the customary way by using the operator control element to register each product which is given out.

According to one development, the at least one operator control element can be communicatively connected to the data memory of the service unit and be designed to bring about updating of the stock record on the data memory when a supply item is removed from the service unit and/or a supply item is input by the service unit. In this development, the service unit (or generally each service unit of a multiplicity of service units) therefore has a current version of its stock record. This can be read out and updated at any time by the flight personnel by means of an operator control element. At the same time, a central version of the stock record of this service unit can also be continuously updated.

According to one development, the service unit can comprise a service unit display. The service unit display can be designed to display the stock record. In one example, the service unit display can be made available in the form of an electronic optical display with an operator control function, e.g. as a touchscreen, via which additional inputs can be made and which serves at the same time as an operator control element of the system. In another example, the service unit can merely have a service unit display without further operator control functions, which service unit display is designed exclusively to output the stock record or other stock management data. In another example, the service unit can have a service unit display for displaying the stock record and additionally a separate operator control element which is coupled to the galley via the wireless connection.

According to one development, the galley can have a galley display. The galley display can be designed to display the stock management data. The galley display can be embodied in specific examples as an electronic optical display or display with or without operator control functions, e.g. as an LED, OLED, TFT or LCD screen or the like with or without background lighting and/or as a touchscreen, etc., which in addition to the outputting of information, also permits inputting via a screen which serves as a touchpad. The galley display can serve to monitor and/or control the galley. For this purpose, the galley display can be coupled to the control unit.

According to one development, the control unit of the galley can be communicatively connected to a cabin management system of the vehicle. For example, the control unit can be connected to a controller area network (CAN) of a cabin management system or the like, via which a connection to external catering service providers, airlines, etc. can also be possible.

The above refinements and developments can be combined with one another as desired where appropriate. Further possible refinements, developments and implementations of the invention also comprise non-explicitly specified combinations of features of the invention which are described above or below with respect to the exemplary embodiments. In particular, in this context a person skilled in the art can also add individual aspects as improvements or additions to the respective basic form of the present invention.

BRIEF DESCRIPTION OF THE DRAWINGS

The present invention will be explained in more detail below on the basis of the exemplary embodiments specified in the schematic figures, of which.

DETAILED DESCRIPTION

The appended figures are intended to convey better understanding of the embodiments of the invention. They illustrate embodiments and serve to explain principles and concepts of the invention in conjunction with the description. Other embodiments and many of the specified advantages are apparent from the drawings. The elements of the drawings are not necessarily shown true to scale with respect to one another.

In the figures of the drawing, identical, functionally identical and identically acting elements, features and components are, unless stated otherwise, each provided with the same reference symbols.

Figure 1:
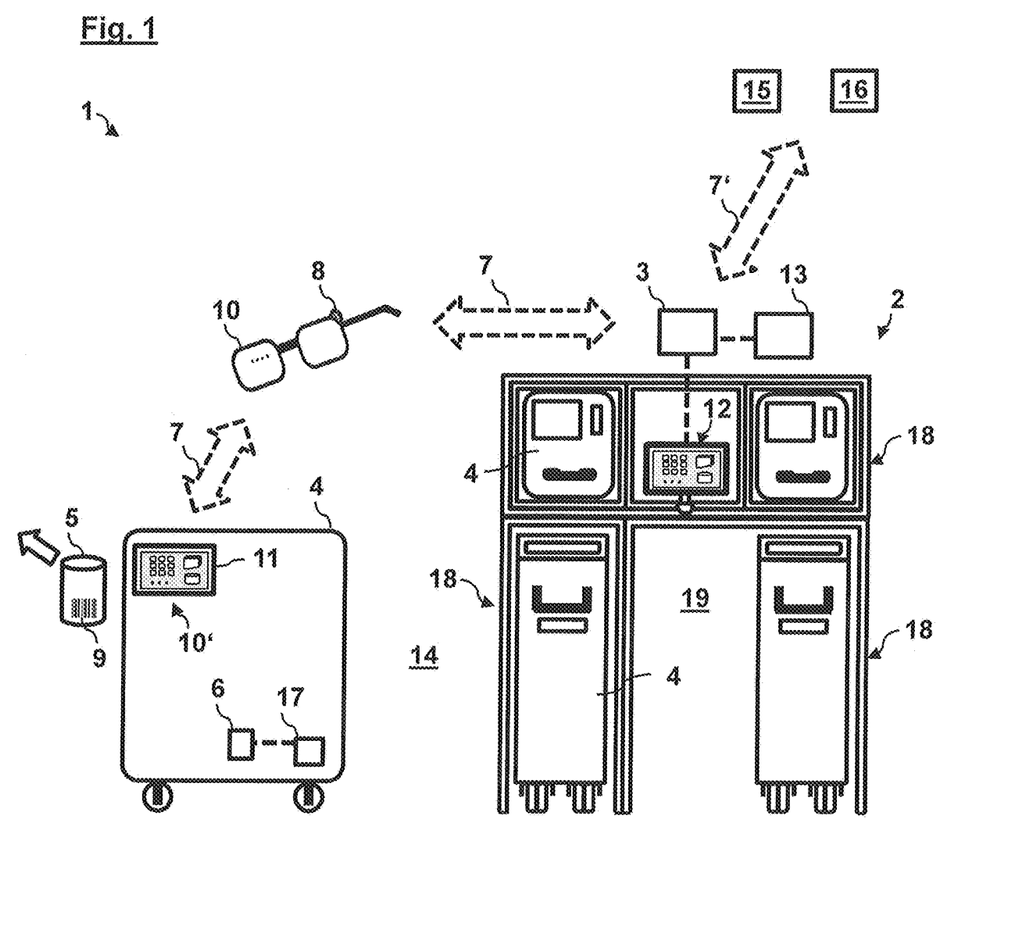
FIG. 1 shows a schematic view of a system for stock management for on-board catering for a vehicle according to an embodiment of the invention.

FIG. 1 shows a schematic view of a system 1 for stock management for on-board catering for a vehicle according to an embodiment of the invention.

Figure 2:
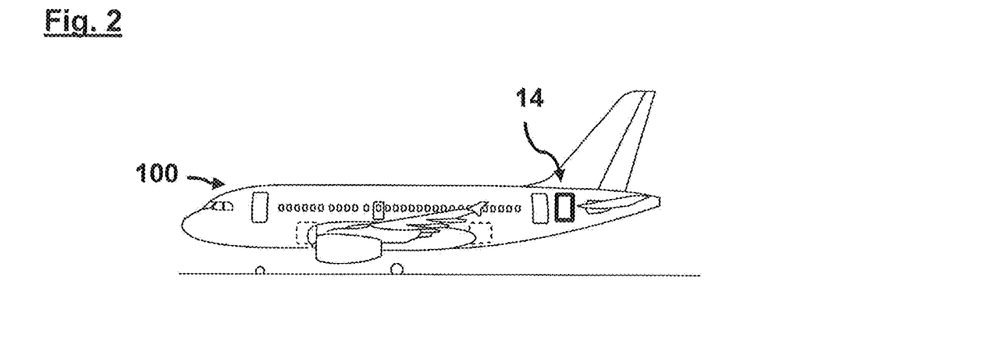
FIG. 2 shows a schematic side view of an aircraft having the system from FIG. 1.

The system 1 is provided in a vehicle cabin 14 of an aircraft 100, in particular of a passenger aircraft, as is illustrated by way of example in FIG. 2. The system 1 comprises a galley 10 which is divided purely by way of example into a plurality of galley monuments 18 in FIG. 1. Each of these galley monuments 18 has one or more slide-in unit compartments 19 which are designed to accommodate one or more service units 4. Therefore, each of the galley units 18 (bottom left in the galley in FIG. 1) has a slide-in unit compartment 19 for accommodating a service unit 4, in this case a roller container. To the right thereof (bottom right in the galley in FIG. 1) in the galley monument 18 a slide-in unit compartment 19 for two roller containers is formed, wherein one of these two roller containers is currently in use (see the service unit 4 on the left in FIG. 1). A third galley monument 18, which can accommodate standard units as service units 4 in individual slide-in unit compartments 19, e.g. food containers, is arranged above these two galley monuments 18. The slide-in unit compartments 19 can have, for example, standardized dimensions for accommodating standardized containers, trolleys or the like.

The upper galley monument 18 comprises an integrated galley display 12. The galley display 12 can be, for example, a screen with OLED or LCD technology or the like, wherein the galley display 12 can be embodied in a touch-sensitive fashion as a touchscreen or touch display. In addition, the galley display 12 can be movably coupled to the galley monument 18. The galley display 12 serves in this exemplary embodiment as a monitoring and/or operator control device for the galley 2. For this purpose, the galley display 12 is connected to a control unit 3 which is designed to control the galley 2. The control unit 3 is in turn connected to a cabin management system 13, e.g. with a controller area network (CAN) or the like. The control unit 3 here can contain further components which are not illustrated, such as for example a microprocessor, a data memory, databases, etc.

The control unit 3 is also designed to make available stock management data of the galley 2, which data can be displayed via the galley display 12. The stock management data comprise, on the one hand, a stock record for each of the service units 4, i.e. for example for the roller container which is located on the left in FIG. 1. The stock record comprises a listing of all the supplies 5 or service products, e.g. meals, drinks, etc., which are located in the respective service unit 4. On the other hand, the stock management data comprise further data such as, for example, catering data, passenger data and/or cabin data or the like. Catering data can be made available, for example, by a caterer 16 such as a catering service provider and can contain, inter alia, information about the supplied on-board catering, i.e. which products are made available to what extent and in which form. Passenger data can be made available, for example, by an airline 15 and can contain, inter alia, information about the passengers, which passengers have registered specific catering requests or options. The cabin data can be made available, for example, by the cabin management system 13 and can contain, inter alia, information relating to the cabin configuration, e.g. a seating plan of the passengers, etc. The control unit 3 can be communicatively connected directly or indirectly by data line or wireless connection 7' to the individual providers or data sources in order to acquire this data. In the exemplary configuration in FIG. 1, the control unit 3 is connected to the cabin management system 13 via a data line and can also be in contact with the airline 15 and the caterer 16, e.g. can call or request data from databases, via a wireless network 7' which is provided for this purpose.

The system 1 additionally comprises a first operator control element 10 which is communicatively connected to the control unit 3 of the galley 2 via a wireless data connection 7, e.g. a secured WLAN network. In the exemplary embodiment in FIG. 1, the first operator control element 10 comprises smartglasses, i.e. data glasses, which are designed to capture the removal of a supply item 5 from the service units 4 and on the basis thereof to bring about updating of the stock record of the transported supplies 5. Likewise, the first operator control element 10 can capture reception of a supplying item 5 by the service unit 4. For this purpose, the first operator control element 10 comprises an identification unit 8 in the form of a camera scanner or imager. The identification unit 8 is embodied as a barcode reader in order to capture and identify a supply item 5 by means of a label 9 attached thereto. For example, the supply item 5 which is illustrated on the left in FIG. 1 can be a drinks can on which a barcode is printed as a label 9. The first operator control element 10 is carried, for example, by a flight attendant (not illustrated) on their body during the serving of food and/or drinks. While the flight attendant gives out the supply item 5, the label 9 is captured by the first operator control element 10 and identified. Subsequently updating of the associated stock record is brought about via the wireless connection 7. The galley 2 is therefore informed at all times about current stock of the supply products.

The first operator control element 10 is also embodied as data glasses which display stock management data, e.g. on one of the lenses of the glasses (indicated by a dashed line on the first operator control element 10 in FIG. 1). In this way, the flight personnel can have passenger data, cabin data and/or catering data displayed to them automatically at any time, e.g. in order to select a booked product for a specific passenger at a specific seating location. At the same time, the first operator control element 10 can also output information about the stock record, so that it is possible to check, for example on the basis of a passenger request, whether the requested product is available in the service unit 4 with the flight attendant or, possibly, one of the other service units 4. It is therefore possible at any time to coordinate passenger information or passenger requests with catering specifications and the configuration of the aircraft. Furthermore, the supplies 5 can be tracked in an automated fashion, in particular in real time, in the vehicle cabin 14 and their availability monitored. For example, the first operator control element 10 can communicate a current position, i.e. for example in which passenger row and/or in which cabin section the crew and/or the service units 4 are currently located. For example, it is possible to dynamically display on the operator control element 10 and/or the service unit 4 which order is present at the respective seat location or the seat row. An automatic dynamic merchandise management and merchandise tracking system is provided for on-board catering for the aircraft 100 as a result, which system monitors an actual state of the catering stock at all times without adversely affecting the issuing of merchandise in any way. It will be directly clear to a person skilled in the art that further functionalities can be readily added. For example, a payment system for the issuing of goods can be implemented by means of the illustrated system 1, wherein corresponding payment actions can be automatically carried out by means of the first operator control element 10 (or some other operator control element).

In the illustrated embodiment of the system 1 there are multiple possible ways of also integrating the service units 4 into the system. In a simple embodiment, the service units 4 can merely be integrated passively into the system 1 without being able to communicate actively via the wireless network 7. Instead, the service units 4 can merely have identification labels, e.g. a barcode. In the exemplary embodiment in FIG. 1, the service unit 4 has on the left of the figure, for example, an actively or passively readable RFID tag 17, by means of which the service unit 4 can be identified by the first operator control element 10. For this purpose, the RFID tag 17 can comprise a customary transponder (not illustrated), and the first operator control element can comprise a corresponding transceiver unit (also not illustrated). A flight attendant can then initially identify the service unit 4 at the start of the issuing of merchandise and unambiguously assign a stock record on the basis thereof to the service unit 4, which stock record has, for example, already been made available centrally in the control unit 3 and has been previously sent there, for example, by the caterer 16 (e.g. by downloading or some other form of data transmission). During the subsequent issuing of merchandise, the stock record can then be updated centrally in the way described above.

The first operator control element 10 can also be designed to authenticate itself with respect to the service unit 4, wherein access to the stock record of the service unit 4 and/or the supplies 5 of the service unit 4 is enabled after successful authentication. The authentication can be carried out, for example, via the wireless network 7, e.g. by means of a corresponding software application which is stored on the first operator control element 10. It is possible to implement on this basis a lock system for the service unit 4 which can be used to unlock and lock the service unit 4 by means of the first operator control unit 10.

Alternatively or additionally, the service unit 4 can also comprise a data memory 6 on which, inter alia, the stock record can be stored. The first operator control element 10 can then be connected to the data memory 6, e.g. the data memory can be coupled to the RFID tag 17 and/or connected to the wireless network 7. In this way, the stock record can not only be stored locally on the service unit 4 (and for example already stored with the delivery of the service unit 4 by a catering service provider) but, moreover, updated at any time by means of the first operator control element 10. The service unit 4 can additionally comprise, for example, a service unit display 11 on which information about the stock record of the service unit 4 and/or about products can be displayed. In this way, the service unit display 11 can function, as it were, as an electronic label.

The system 1 can basically comprise, in addition to the first operator control element 10, further operator control elements which can be embodied differently. For example, in addition to data glasses it is also possible to use smartphones, smartwatches, tablet computers and/or other portable computers. In the embodiment in FIG. 1, a second operator control element 10' is provided merely by way of example, which operator control element 10' cannot be worn on the flight attendant's body but is instead permanently integrated by the service unit 4. The service unit display 11 of the service unit 4 serves in this case as a second operator control element 10' and is for this purpose embodied as a touchscreen via which not only information can be displayed but, furthermore, it is also possible to make inputs. Just like the first operator control element 10, the second operator control element 10' can also be designed to register and identify the supplies 5. For this purpose, for example a barcode reader can be combined with the touchscreen (not illustrated). Just as has been described above for the first operator control element 10, the flight attendant can also carry out the issuing of products by means of the second operator control element 10' by registering supplies 5 while they are issued and correspondingly updating the stock record. For this purpose, the service unit 4 or the second operator control element 10' can be connected to the wireless network 7. Depending on the flight situation it may be advantageous to use the first operator control element 10 or the second operator control element 10' for the issuing of merchandise. In this embodiment variant, the illustrated system 1 is therefore particularly flexible.

Figure 3:
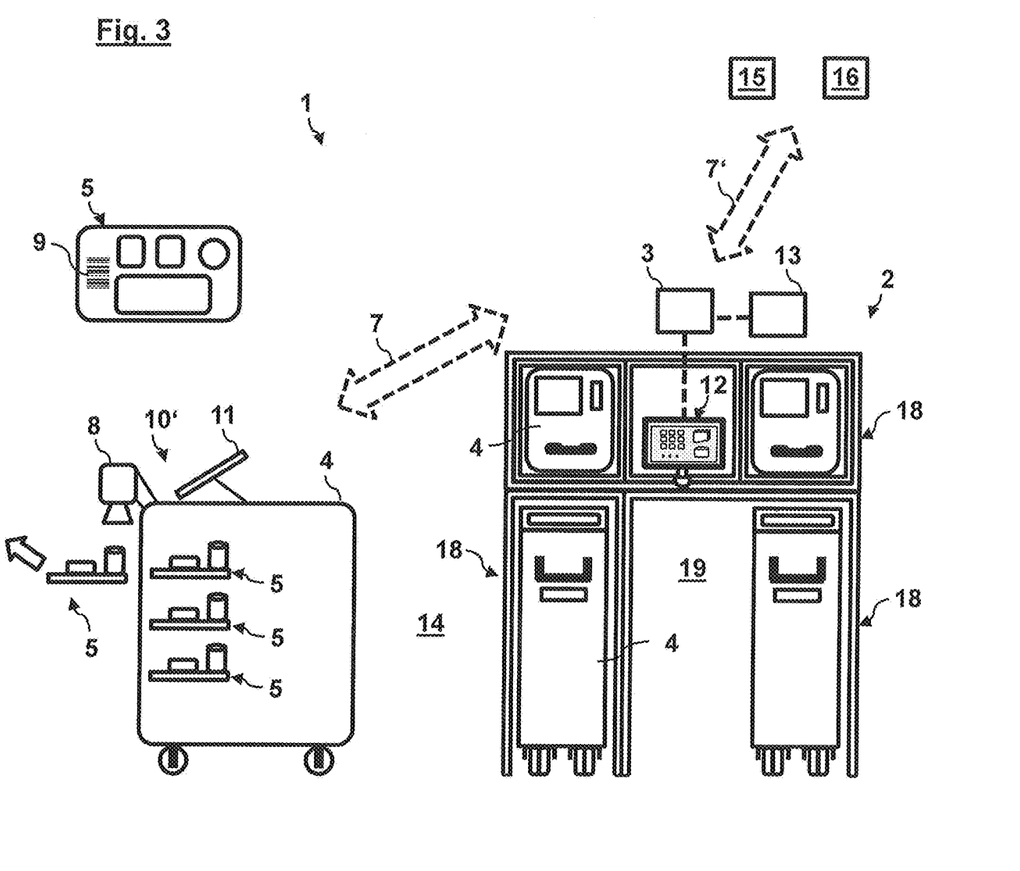
FIG. 3 shows a schematic view of a system for stock management for on-board catering for a vehicle according to a further embodiment of the invention.

FIG. 3 shows a schematic view of a system 1 for stock management for on-board catering for a vehicle 100 according to a further embodiment of the invention.

Basically, the system 1 in FIG. 3 is similar to that in FIG. 1. Purely by way of example, an operator control element 10' is illustrated here which is integrated with a service unit display 11, embodied as a touchscreen, in an upper side of the service unit 4. In addition, the operator control element 10' has, on the upper side of the service unit 4, an identification unit 8 for reading out labels 9 which are attached to supplies 5 and/or is communicatively connected to said identification unit 8. The identification unit 8 can be embodied, for example, as a barcode reader, e.g. a CCD scanner or a camera which can read a barcode as a label 9.

In this specific example, the service unit 4 carries a multiplicity of supplies 5 in the form of trays which are each pre-packed with a plurality of products, e.g. ready-made meals, drinks, etc. Each tray 5 is provided here with a label 9, e.g. a barcode (cf. the tray 5 top left in FIG. 3). The label 9 is read out by the identification unit 8 when a tray 5 is removed. Subsequently, the stock record of the service unit 4 is updated. The system 1 can be initialized manually or automatically here, for example by the opening of a door of the service unit 4 and/or by the activation of a software application of the operator control element 10'.

Likewise there may be provision that the products which are located on the tray 5 are identified directly, e.g. likewise by means of barcodes or the like which are attached to the products. In alternative refinements, the identification unit 8 can also determine the external shape of the products and on this basis identify the products and/or the trays 5, e.g. by optically capturing the external shape, for example on the basis of object recognition algorithms, which are based on object models of the products. The identification unit 8 can be fixedly integrated into the service unit 4. Alternatively, the identification unit 8 can be part of a portable operator control element and/or can be coupled communicatively thereto.

Figure 4:
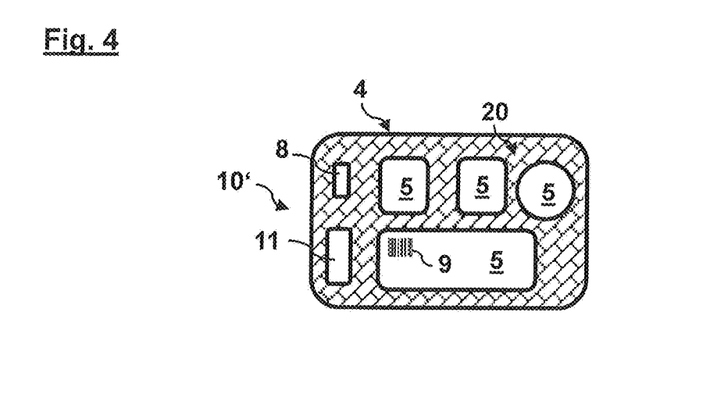
FIG. 4 shows a schematic view of a service unit for a system for stock management for on-board catering for a vehicle according to a further embodiment of the invention.

FIG. 4 shows a schematic view of a service unit 4 for a system 1 for stock management for on-board catering for a vehicle 100 according to a further embodiment of the invention.

In this case, the service unit 4 is embodied as an electronic tray which, by means of an operator control element 10', detects the supplies 5 which have been placed on the tray and/or removed therefrom, and identifies said supplies by means of labels 9 which are attached to the supplies 5. For this purpose, the operator control element 10' comprises an identification unit 8 which can be embodied, for example, as a barcode reader. In addition, the operator control element 10' optionally has a service unit display 11 which can, for example, output information about the stock record. The tray is therefore embodied as a "smart tablet", wherein the stock record is automatically updated.

In the exemplary embodiment in FIG. 4, the service unit 4 additionally comprises one or more weight sensors 20. For example, a bearing surface of the tray can be embodied as a weighing cell. In such a development, the consumption of the supplies 5 located on the service unit 4 can be monitored. In this way it is possible for a signal to the on-board personnel to be generated automatically if a drink needs to be refilled, for example. Of course, it is also possible to use other sensor technologies for this purpose.

The essential advantages of the described stock management for on-board catering can be summarized as follows:
- It is ensured at all times that the correct quantity of products is present so that the stock can be managed in an optimum and efficient way.
- The turnover, the utilization of resources and the planning are improved.
- The stock management and the catering can be tailored in general in an optimum way to customer requests by the linking of different pieces of information and the collection of data.
- The organization, the efficiency and the clear arrangement of the galley are optimized.

In the preceding detailed description, various features for improving the rigour of the illustration have been combined in one or more examples. However, it should be clear that the above description is merely illustrative, but in no way of a restrictive nature. It serves to cover all the alternatives, modifications and equivalents of the various features and exemplary embodiments. Many other examples will be immediately and directly clear to a person skilled in the art from the above description on the basis of his specialist knowledge.

The exemplary embodiments have been selected and described in order to be able to illustrate in the best possible way the principles on which the invention is based and their application possibilities in practice. As a result, specialist personnel can modify and use the invention and its various exemplary embodiments in an optimum way with respect to the intended purpose of use. In the claims and the description, the terms "containing" and "having" are used as neutral expressions for the corresponding terms "comprising". Furthermore, a use of the terms "a" and "an" is not basically intended to exclude the possibility of a multiplicity of such described features and components.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMBERS

1 System
2 Galley
3 Control unit
4 Service unit
5 Supply item
6 Data memory
7, 7' Wireless data connection
8 Identification unit
9 Label
10 First operator control element
10' Second operator control element
11 Service unit display
12 Galley display
13 Cabin management system
14 Vehicle cabin
15 Airline
16 Caterer
17 RFID tag/transponder
18 Galley monument
19 Slide-in unit compartment
20 Weight sensor
100 Aircraft

The invention claimed is:

1. A system for stock management for on-board catering for a vehicle, comprising:
a galley provided with a control unit for controlling the galley, wherein the control unit is configured to make available stock management data of the galley;
a service unit for transporting supplies within the vehicle, wherein the stock management data comprise a stock record of the supplies transported in the service unit; and
at least one operator control element communicatively connected to the control unit of the galley via a wireless data connection and configured to record removal of a supply item from the service unit and/or reception of a supply item by the service unit, and to bring about updating of the stock record of the transported supplies on the basis thereof,
wherein the at least one operator control element comprises an operator control element permanently integrated in the service unit, and
wherein the at least one operator control element has an identification unit configured to identify a supply item, the identification unit integrated into the service unit and configured to identify the supply item while the supply item is inserted into or removed out of the service, wherein the identification unit comprises a camera to identify the supply item by optically capturing an external shape of the supply item.

2. The system according to claim 1, wherein the identification unit is embodied as a barcode reader.

3. The system according to claim 1, wherein the at least one operator control element is configured to display the stock management data.

4. The system according to claim 1, wherein the stock management data comprise at least one of catering data, passenger data and cabin data.

5. The system according to claim 1, wherein the operator control element is a touchscreen.

6. The system according to claim 1, wherein the at least one operator control element is configured to identify the service unit and to assign the stock record to the service unit on the basis thereof.

7. The system according to claim 1, wherein the service unit comprises a data memory configured to store the stock record.

8. The system according to claim 7, wherein the at least one operator control element is communicatively connected to the data memory of the service unit and is configured to read the stock record out of the data memory.

9. The system according to claim 7, wherein the at least one operator control element is communicatively connected to the data memory of the service unit and is configured to bring about updating of the stock record on the data memory when a supply item is removed from the service unit and/or a supply item is input by the service unit.

10. The system according to claim 1, wherein the service unit comprises a service unit display configured to display the stock record.

11. The system according to claim 1, wherein the galley has a galley display configured to display the stock management data.

12. The system according to claim 1, wherein the control device of the galley is communicatively connected to a cabin management system of the vehicle.

13. The system according to claim 1, wherein the service unit is a service trolley, a container or a tray.

14. An aircraft comprising a system according to claim 1.

* * * * *